United States Patent
Son (10) Patent No.: US 7,412,474 B2
(45) Date of Patent: Aug. 12, 2008

(54) MONTGOMERY MODULAR MULTIPLIER USING A COMPRESSOR AND MULTIPLICATION METHOD

(75) Inventor: Hee-Kwan Son, Suwon (KR)

(73) Assignee: Samsung Electronics Co., Ltd., Gyeonggi-do (KR)

(*) Notice: Subject to any disclaimer, the term of this patent is extended or adjusted under 35 U.S.C. 154(b) by 770 days.

(21) Appl. No.: 10/660,476

(22) Filed: Sep. 12, 2003

(65) Prior Publication Data

US 2004/0125948 A1 Jul. 1, 2004

(30) Foreign Application Priority Data

Dec. 30, 2002 (KR) .................. 10-2002-0087243

(51) Int. Cl.
*G06F 7/00* (2006.01)
(52) U.S. Cl. .................. 708/492; 708/490; 380/28; 380/30
(58) Field of Classification Search ................ 708/492; 380/28, 30
See application file for complete search history.

(56) References Cited

U.S. PATENT DOCUMENTS

| | | | | |
|---|---|---|---|---|
| 5,073,870 | A | * | 12/1991 | Morita .................. 708/491 |
| 5,745,398 | A | | 4/1998 | Monier |
| 6,151,393 | A | * | 11/2000 | Jeong .................. 380/265 |
| 6,920,473 | B2 | | 7/2005 | Elbe et al. |
| 6,973,470 | B2 | * | 12/2005 | Takahashi et al. .......... 708/491 |
| 2004/0054705 | A1 | * | 3/2004 | Le Quere .................. 708/491 |

FOREIGN PATENT DOCUMENTS

| | | |
|---|---|---|
| DE | 695 06 674 T2 | 5/1999 |
| FR | 2 788 867 | 7/2000 |
| WO | WO 02/067108 A2 | 8/2002 |
| WO | WO 02/073450 | 9/2002 |

OTHER PUBLICATIONS

Takagi N Ed-Kornerup P et al: "A radix-4 modular multiplication hardware algorithm efficient for iterative modular multiplication hardware algorithm efficient for iterative modular multiplications" Computer Arithmetic, 1991, Los Alamitos, CA, USA, IEEE Comput. Soc, US, Jun. 26, 1991, pp. 35-42, XP010034049 isbn:0-8186-9151-4.

Drescher W et al: "VLSI architectures for multiplication in GF(2<m>) for application tailored digital signal processors" VLSI Signal Processing, IX, 1996., Yworkshop on San Francisco, CA, USA, Oct. 30-Nov. 1, New York, NY, USA, IEEE, US, Oct. 30, 1996, pp. 55-64, XP010198998, isbn: 0-7803-3134-6.

(Continued)

*Primary Examiner*—Lewis A. Bullock, Jr.
*Assistant Examiner*—Michael Yaary
(74) *Attorney, Agent, or Firm*—Harness, Dickey & Pierce, P.L.C.

(57) ABSTRACT

A Montgomery modular multiplier receiving a multiplicand (A), a modulus (M), and a multiplier (B), using a t-s compressor, where t>3 and s>1, and a multiplication method performed in the same. In response to a carry propagation adder signal, the t-s compressor performs additions on the carry C and the sum S and obtains the final results in a carry propagation adder structure.

19 Claims, 4 Drawing Sheets

OTHER PUBLICATIONS

Orup H Ed Knowles S et al: "Simplifying quotient determination in high-radix modular multiplication": Computer Arithmetic, 1995., Proceedings of the 12$^{th}$ Symposium on Bath, UK Jul. 19-21, 1995, Los Alamitos, CA, USA, IEEE Comput. Soc, US, Jul. 19, 1995, pp. 193-199, XP010146635, ISBN: 0-8186-7089-4.

Preliminary Search Report for French Divisional App. No. 04-3488 dated Mar. 24, 2006.

Preliminary Search Report for French App. No. 03-14199 dated Mar. 27, 2006.

German Patent Office Action dated Oct. 17, 2007, for corresponding German Application No. P 10357661.4-53.

* cited by examiner

MONTGOMERY MODULAR MULTIPLIER USING A COMPRESSOR AND MULTIPLICATION METHOD

BACKGROUND OF THE INVENTION

This application claims priority from Korean Patent Application No. 10-2002-87243, filed on Dec. 30, 2002, the entire contents of which are hereby incorporated by reference.

1. Field of the Invention

The present invention relates to a public-key cryptographic system, and more particularly, to a Montgomery modular multiplier.

2. Description of the Related Art

Cryptographic systems are used in communications achieved through smart cards, IC cards, and the like and have developed from secret-key cryptographic systems to public-key cryptographic systems. In a secret-key cryptographic system, two users must share an identical secret key in order to communicate with each other. Hence, key management and digital signing, which are based on a secret-key cryptographic system, are difficult. On the other hand, in a public-key cryptographic system, a secret key is secured by each user and any user who knows the public key of another party can communicate with that party, facilitating a process of convenient secret communications.

Examples of a public-key cryptographic system include Ron Rivest, Adi Schamir, and Len Adleman (RSA), Diffie-Hellman, a Digital Signature Algorithm (DSA), an Elliptic Curve Cryptosystem (ECC), and the like. Since a public-key cryptographic system performs modular multiplication to achieve a modular exponentiation operation, the system must adopt a modular multiplier.

A Montgomery modular multiplication algorithm, known as the most effective modular multiplication algorithm, can be expressed in pseudo code, as in Algorithm 1 below:

[Algorithm 1]

Stimulus:
    $A = (a_{n-1} a_{n-2} \ldots a_1 a_0)_2$, and $A < M$
    $B = (b_{n-1} b_{n-2} \ldots b_1 b_0)_2$, and $B < M$
    $M = (m_{n-1} m_{n-2} \ldots m_1 m_0)_2$, and M is odd.
Response:
    $S = (S_n S_{n-1} S_{n-2} \ldots S_1 S_0)_2 \equiv ABR^{-1} \pmod{M}$
Method:
    $S := 0$
    For $i := 0$ to $n-1$ do
        $qi := s_0$ XOR $(b_i$ AND $a_0)$
        $S := (S + b_i A + q_i M)/2$
    endfor That is, in Algorithm 1, a final S (sum) (in Algorithm 1, carry is expressed as $S_n$) that is calculated in a "for" loop is congruent to $ABR^{-1} \pmod{M}$. Here, "$R^{-1}$" is an inverse number of R modular-multiplied for "mod M". When R is equal to $2^n$, "$(R*R^{-1})$ mod M" is equal to 1.

The Montgomery modular multiplication algorithm performs only multiplications on given numbers A, B, and M, without using divisions, and is faster than other algorithms. Hence, the Montgomery modular multiplication algorithm is widely used in implementing public-key cryptographic systems, which require a modular exponentiation operation.

Conventional Montgomery modular multipliers based on a Montgomery modular multiplication algorithm are classified as a parallel multiplier, which uses a carry propagation adder as a basic accumulator, or a serial multiplier, which uses a 3-2 (3-input to 2-output) compressor (i.e., a carry save adder made up of full adders) as a basic accumulator.

A carry propagation adder requires a carry-propagation delay time on a clock-by-clock basis to propagate a carry upon every addition of multiple bits. Since the carry propagation adder cannot increase the carry-propagation delay time without limit, multiplication of numbers represented by 32 bits or more is difficult. In other words, the carry propagation adder has a larger power-delay product than in a carry save adder. The multiplication of a 32-bit number by a 32-bit number must be repeated in order to perform a multiplication of numbers represented by 32 bits or more.

Since a serial multiplier that uses a carry save adder uses a 3-2 compressor (i.e., full adders), there are no problems of a propagation delay time, but the serial multiplier with the carry save adder is not easily implemented in hardware. The 3-2 compressor removes the propagation delay time by performing all additions on each bit at as many clock pulses as the number of bits. In other words, in a Montgomery modular multiplication algorithm such as Algorithm 1, the four words carry, S, $b_i A$, and $q_i M$ must be summed. However, the 3-2 compressor can only receive 3 words, and accordingly, a problem arises in that the two main input words $b_i A$ and $q_i M$ need to be summed in advance. Also, when the 3-2 compressor performs addition, it must receive carry, S, and one of the four words (namely, carry, S, $b_i A$, and $q_i M$) and accordingly, requires a 4:1 multiplexer to select one of the four words.

SUMMARY OF THE INVENTION

Embodiments of the present invention provide a Montgomery modular multiplier that removes and/or reduces propagation delay time using a carry save adder (CSA) structure, in which all additions required for each bit are performed on four words (e.g., carry, S, $b_i A$, and $q_i M$), and additions in a carry propagation adder (CPA) structure are performed at an output stage, thereby achieving a fast operation speed and a small power-delay product.

Embodiments of the present invention also provide a Montgomery modular multiplication method in which a propagation delay time is removed and/or reduced using a carry save adder (CSA) structure, which performs all additions required for each bit on four words (e.g., carry, S, $b_i A$, and $q_i M$), and performs additions in a carry propagation adder (CPA) structure at an output stage, thereby achieving fast operation speed and a small power-delay product.

Another exemplary embodiment of the present invention, provides a Montgomery modular multiplier which calculates a value congruent to "$ABR^{-1}$" (mod M), where A and B are input n-bit numbers, $R^{-1}$ is an inverse number of R modular-multiplied for "mod M", and M is a modulus. The Montgomery modular multiplier includes an A-register, a B-register, an M-register, a $b_i A$ calculation logic circuit, a $q_i$ calculation logic circuit, a $q_i M$ calculation logic circuit, a 4-2 compressor, an S-register, and a C-register.

The A-register stores a bit value $a_i$ (where i is an integer ranging from 0 to n−1) of the number A, which is smaller than the modulus M.

The B-register stores a bit value $b_i$ (where i is an integer ranging from 0 to n−1) of the number B, which is smaller than the modulus M.

The M-register stores a bit value $m_i$ (where i is an integer ranging from 0 to n−1) of the modulus M, which is an odd number.

The $b_i A$ calculation logic circuit multiplies the number A by a bit value $b_i$ to obtain each bit of $b_i A$.

The $q_i$ calculation logic circuit solves a Boolean logic equation "$s_0$ XOR $c_0$ XOR ($b_i$ AND $a_0$)", where $s_0$ is the least significant bit (LSB) of a sum S, $c_0$ is the LSB of a carry C, $b_i$ is the bit value of the number B, and $a_0$ is the LSB of the number A, to obtain a bit value $q_i$ (where i denotes an integer in the range of 0 to n*1).

The $q_iM$ calculation logic circuit multiplies the modulus M by the bit value $q_i$ to obtain each bit of $q_iM$.

In an exemplary embodiment of the present invention the 4-2 compressor first performs n additions on the carry C, the sum S, the $b_iA$, and the $q_iM$ to obtain interim values for each bit of the sum S and the carry C in a carry save adder structure and then sums the interim values to obtain final results of the S and C in a carry propagation adder structure, in response to a carry propagation adder signal.

The S-register updates a bit value $s_i$ (where i is an integer ranging from 0 to n−1) of the sum S and stores the updated bit value.

The C-register updates a bit value $s_i$ (where i is an integer ranging from 0 to n−1) of the carry C and stores the updated bit value.

In an exemplary embodiment of the present invention the 4-2 compressor includes a first full adder unit, a MUX unit, and a second full adder unit. The first full adder unit sums a bit value $b_ia_i$ of the $b_iA$, a bit value $s_{i+1}$ of the sum S, and the bit value $c_i$ of the carry C to obtain a carry $cA_i$ and a sum $sA_i$.

In an exemplary embodiment of the present invention the MUX unit selectively outputs either a bit value $q_iM_i$ of the $q_iM$, the carry $cA_{i-1}$, and the sum $sA_i$ or the bit value $s_{i+1}$ of the sum S, the bit value $c_i$ of the carry C, and the bit value $c_{i-1}$ of the C, in response to the carry propagation adder signal.

The second full adder unit performs n additions on the bit value $q_im_i$ of the $q_iM$, the carry $cA_{i-1}$, and the sum $sA_i$ to calculate interim bit values $s_i$ and $c_i$ of the sum S and the carry C, when the carry propagation adder signal is in an inactive state, and then sums the bit value $s_{i+1}$ of the sum S, the bit value $c_i$ of the carry C, and the bit value $c_{i-1}$ of the carry C to obtain final results of the sum S and carry C, when the carry propagation adder signal is in an active state.

In an exemplary embodiment of the present invention the carry save adder structure is a 4-input 2-output structure, in which the first and second full adder units operate when the carry propagation adder signal is in an inactive state.

In an exemplary embodiment of the present invention the carry propagation adder structure is a 3-input 2-output structure, in which only the second full adder unit operates when the carry propagation adder signal is in an active state.

The LSB of the carry $cA_{i-1}$, and the LSB of the carry $c_{i-1}$ are in a first logic state.

The MSB of the sum $s_{i+1}$ is equal to the carry $cA_{n-1}$ at a clock pulse before the carry propagation adder signal is activated.

Another exemplary embodiment of the present invention, provides a method of performing a Montgomery modular multiplication in a Montgomery modular multiplier, which includes registers for storing bit values $a_i$, $b_i$, $m_i$, $c_i$, and $s_i$ (where i denotes an integer in the range of 0 to n*1) of a word A, a word B, a modulus M, a carry C, and a sum S, respectively, and calculates a value congruent to "$ABR^{-1}$" (mod M), where A and B are input n-bit numbers, $R^{-1}$ is an inverse number of R modular-multiplied for "mod M", and M is a modulus. In the method, the number A, the number B, and the modulus M are received. The number A is multiplied by a bit value $b_i$ to obtain each bit of $b_iA$. A Boolean logic equation "$s_0$ XOR $c_0$ XOR ($b_i$ AND $a_0$)", where $s_0$ is the least significant bit (LSB) of a sum S, $c_0$ is the LSB of a carry C, $b_i$ is the bit value of the number B, and $a_0$ is the LSB of the number A, is obtained to obtain a bit value $q_i$ (where i denotes an integer in the range of 0 to n*1). The number M is multiplied by the bit value $q_i$ to obtain each bit of $q_iM$. Then, n additions are performed on the carry C, the sum S, the $b_iA$, and the $q_iM$ to obtain interim values for each bit of the sum S and the carry C in a carry save adder structure, in response to a carry propagation adder signal. The interim values are summed to obtain the final results of the sum S and carry C in a carry propagation adder structure, in response to the carry propagation adder signal.

In an exemplary embodiment the number A is smaller than the modulus M.

In an exemplary embodiment the number B is smaller than the modulus M.

In an exemplary embodiment the modulus M is an odd number.

In an exemplary embodiment the interim and final values of the sum S and the interim and final values of the carry C are calculated by: summing a bit value $b_iA_i$ of the $b_iA$, a bit value $s_{i+1}$ of the sum S, and the bit value $c_i$ of the carry C to obtain a carry $cA_i$ and a sum $sA_i$; selectively outputting either a bit value $q_iM_i$ of the $q_iM$, the carry $cA_{i-1}$, and the sum $sA_i$ or the bit value $s_{i+1}$ of the sum S, the bit value $c_i$ of the carry C, and a bit value $c_{i-1}$ of the carry C, in response to the carry propagation adder signal; performing n additions on the bit value $q_im_i$ of the $q_iM$, the carry $cA_{i-1}$, and the sum $sA_i$ to calculate interim bit values $s_i$ and $c_i$ of the sum S and the carry C, when the carry propagation adder signal is in an inactive state; and summing the bit value $s_{i+1}$ of the sum S, the bit value $c_i$ of the carry C, and the bit value $c_{i-1}$ of the carry C to obtain final results of the sum S and carry C, when the carry propagation adder signal is in an active state.

In an exemplary embodiment the carry save adder structure is a 4-input 2-output structure, in which the interim values of the sum S and the carry C are obtained from the $b_iA$ and $q_iM$ when the carry propagation adder signal is in an inactive state. However the carry save adder can have a plurality of inputs and output structures.

The carry propagation adder structure is a 3-input 2-output structure, in which the final values of the sum S and the carry C are obtained from the interim values of the sum S and the carry C when the carry propagation adder signal is in an active state. However the carry propagation adder can have a plurality of inputs and output structures.

The LSB of the carry $cA_{i-1}$ and the LSB of the carry $c_{i-1}$ are in a first logic state.

The MSB value of the sum $s_{i+1}$ is equal to the bit value $cA_{n-1}$ at a clock before the carry propagation adder signal is activated.

BRIEF DESCRIPTION OF THE DRAWINGS

The features of embodiments of the present invention will become more apparent from the detailed description and accompanying drawings, wherein.

DETAILED DESCRIPTION OF EXEMPLARY EMBODIMENTS OF THE INVENTION

The following description of the exemplary embodiment(s) is merely exemplary in nature and is in no way intended to limit the invention, its application, or uses.

Embodiments of the present invention will now be described more fully with reference to the accompanying drawings, in which exemplary embodiments of the invention are shown. The embodiments of the present invention are provided in order to more completely explain the present invention to anyone skilled in the art.

Figure 1:
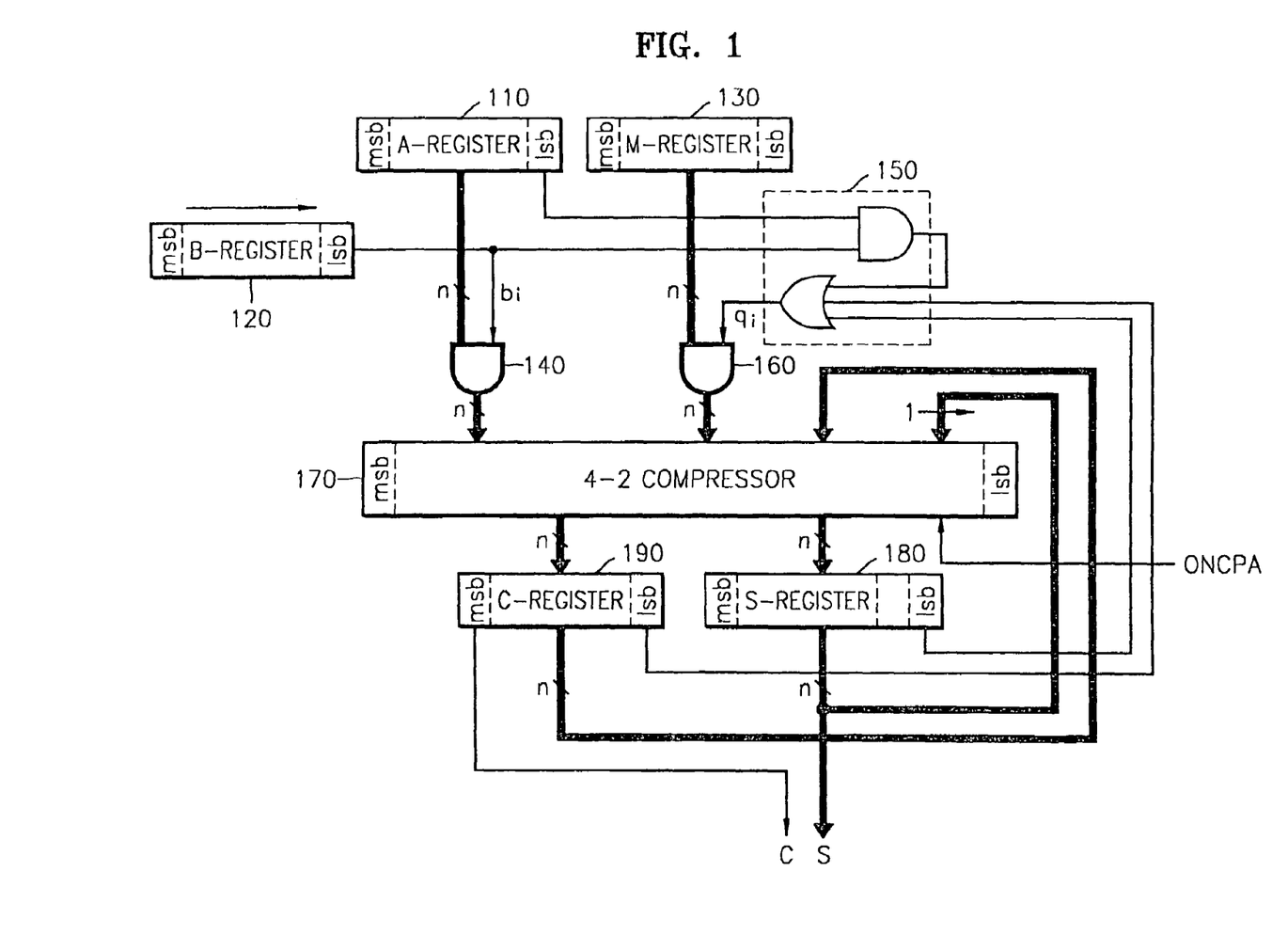
FIG. 1 is a block diagram of a Montgomery modular multiplier according to an embodiment of the present invention.

Referring to FIG. 1, a Montgomery modular multiplier according to an embodiment of the present invention calculates a value congruent to "$ABR^{-1}$" (mod M). Here, A and B are input n-bit numbers, and $R^{-1}$ is the inverse number of R modular-multiplied for "mod M." To accomplish this, the Montgomery modular multiplier includes an A-register 110, a B-register 120, an M-register 130, a $b_iA$ calculation logic circuit 140, a $q_i$ calculation logic circuit 150, a $q_iM$ calculation logic circuit 160, a 4-2 compressor 170, an S-register 180, and a C-register 190.

The A-register 110 stores the bit value $a_i$ (where i denotes an integer in the range of 0 to n*1) of the number A, which is smaller than the modulus M. The number A denotes a word representing an input n-bit number, and $a_i$ is the value of each of the bits $a_0$ to $a_{n-1}$ that constitute the number A.

The B-register 120 stores the bit value $b_i$ (where i denotes an integer in the range of 0 to n*1) of the number B, which is smaller than the modulus M. The number B denotes a word representing an input n-bit number, and $b_i$ is the value of each of the bits $b_0$ to $b_{n-1}$ that constitute the number B.

The M-register 130 stores the bit value $m_i$ (where i denotes an integer in the range of 0 to n*1) of the modulus M, which is an odd number. The modulus M denotes a word representing an input n-bit number, and $m_i$ is the value of each of the bits $m_0$ to $m_{n-1}$ that constitute the modulus M.

The $b_iA$ calculation logic circuit 140 calculates each bit of $b_iA$ by multiplying the number A by the bit value $b_i$. Consequently, the values of the n bits $b_ia_0$ to $b_ia_{n-1}$ are output. At this time, since i varies from 0 to n*1 in the "for" loop included in Algorithm 1, the value $b_i$ is obtained from the position of the least significant bit (LSB) of the B-register 120, which is right shifted by one bit every time an algorithm in the "for" loop is performed, as shown in FIG. 1.

The $q_i$ calculation logic circuit 150 calculates the value $q_i$ (where i denotes an integer in the range of 0 to n*1) used in the "for" loop of Algorithm 1 by solving the Boolean logic equation "$s_0$ XOR $c_0$ XOR ($b_i$ AND $a_0$)". Here, $s_0$ is the LSB of a sum S, $c_0$ is the LSB of a carry C, $b_i$ is a bit value of the number B, and $a_0$ is the LSB of the number A. At this time, since i varies from 0 to n*1 in the "for" loop included in Algorithm 1, a value $b_i$ is obtained from the position of the LSB of the B-register 120, which is right shifted by one bit every time an algorithm in the "for" loop is performed, as shown in FIG. 1.

The $q_iM$ calculation logic circuit 160 calculates each bit of $q_iM$ by multiplying the modulus M by the bit value $q_i$. Consequently, the values of the n bits $q_im_0$ to $q_im_{n-1}$ are output. At this time, since i varies from 0 to n*1 in the "for" loop included in Algorithm 1, i increases by one every time an algorithm in the "for" loop is performed, as shown in FIG. 1. Consequently, the values of the n bits $q_0$ to $q_{n-1}$ are output.

In an exemplary embodiment of the present invention, in response to a carry propagation adder signal ONCPA, the 4-2 compressor 170 performs n additions on the C, the S, the $b_iA$, and the $q_iM$ to obtain interim calculated values for each bit of the S and the C, in a carry save adder structure. Then, the 4-2 compressor 170 sums the interim calculated values to obtain the final results of the S and C, in a carry propagation adder structure. When the carry propagation adder signal ONCPA is in an inactive state, that is, is in a first logic state ("0"), first and second full adders operate at the same time in the carry save adder structure, thus forming a 4-input 2-output structure. When the carry propagation adder signal ONCPA is in an active state, that is, is in a second logic state ("1"), only the second full adders operate in the carry propagation adder structure, thus forming a 3-input 2-output structure.

The S-register 180 updates and stores the bit value $s_i$ of the S (where i denotes an integer in the range of 0 to n*1). In other words, S denotes a word representing an n-bit number that is output as a sum, and $s_i$ denotes the value of each of the bits $s_0$ to $s_{n-1}$ that constitute the word S. The word S is updated every time an addition is performed in the carry save adder or carry propagation adder included in the 4-2 compressor 170.

The C-register 190 updates and stores the bit value $c_i$ of the C (where i denotes an integer in the range of 0 to n*1). In other words, C denotes a word representing an n-bit number that is output as a carry, and $c_i$ denotes the value of each of the bits $c_0$ to $C_{n-1}$ that constitute the word C. The word C is updated every time an addition is performed in the carry save adder or carry propagation adder included in the 4-2 compressor 170.

Figure 2:
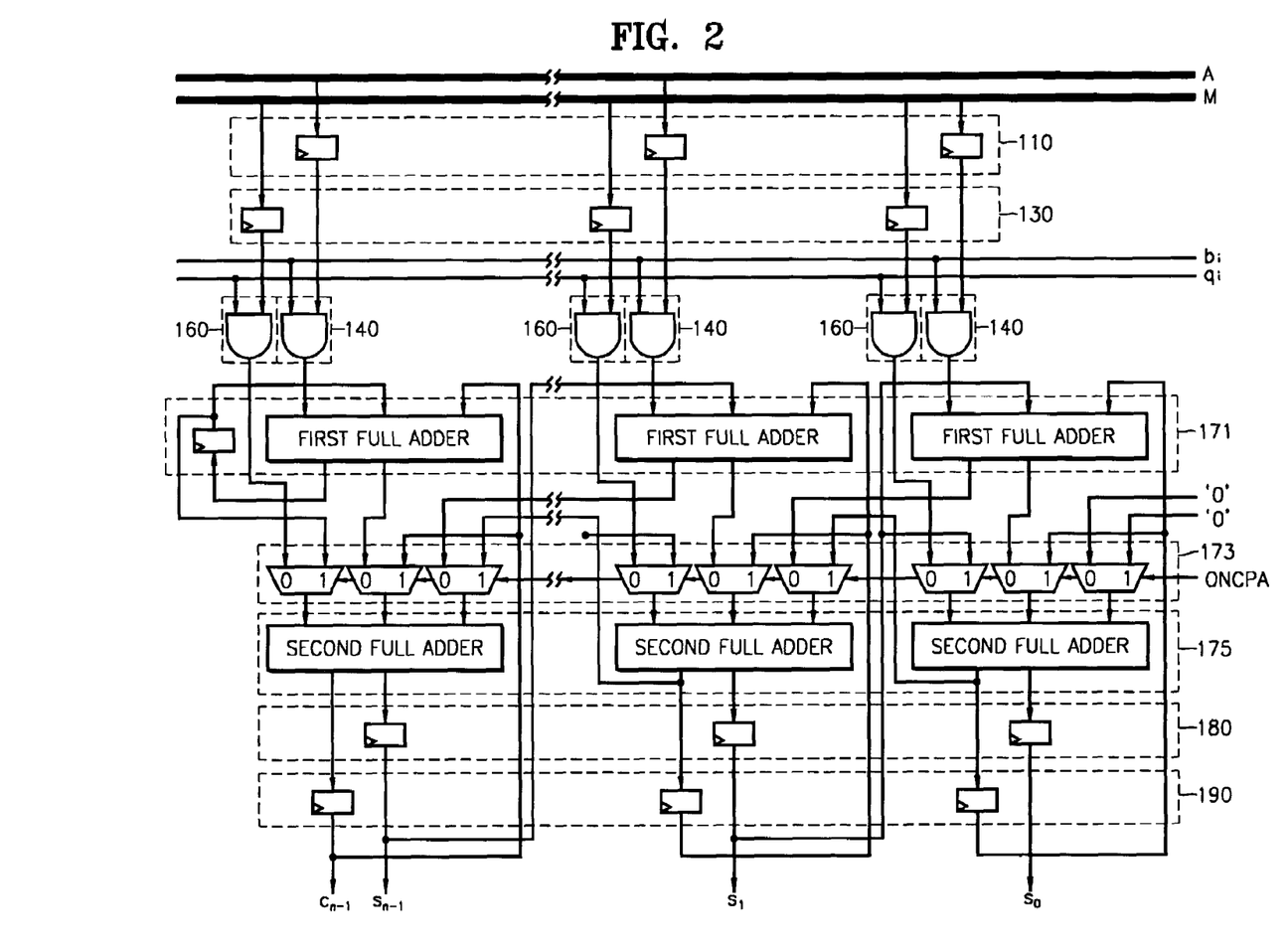
FIG. 2 is a block diagram of the 4-2 compressor of FIG. 1 and its peripheral circuits in greater detail in an exemplary embodiment of the present invention.

FIG. 2 is a block diagram of the 4-2 compressor 170 of FIG. 1 and its peripheral circuits in greater detail. Referring to FIG. 2, the 4-2 compressor 170 includes first and second full adder units 171 and 175 and a MUX unit 173, which form an adder with a 4-input 2-output structure.

Each of the first full adders of the first full adder unit 171 sums its corresponding bit value of the $b_iA$, the bit value $s_{i+1}$ of the S, and the bit value $c_i$ of the C to obtain a carry $cA_i$ and a sum $sA_i$. The corresponding bit value of the $b_iA$ is $b_ia_i$.

Each of the multiplexers in MUX unit 173 selectively output either its corresponding bit value of the $q_iM$, the carry $cA_{i-1}$, and the sum $sA_i$ or the bit value $s_{i+1}$ of the S, the bit value $c_i$ of the C, and the bit value $c_{i-1}$ of the C, in response to the carry propagation adder signal ONCPA. The corresponding bit value of the $q_iM$ is $q_im_i$.

When the carry propagation adder signal ONCPA is in an inactive state, that is, in a first logic state "0", each of the second full adders of the second full adder unit 175 performs n additions on the bit value $q_im_i$ of the $q_iM$, the carry $cA_{i-1}$, and the sum $sA_i$ to calculate interim bit values $s_i$ and $c_i$ of the S and the C. When the carry propagation adder signal ONCPA is in an active state, that is, is in a second logic state "1", each of the second full adders of the second full adder unit 175 sums the bit value $s_{i+1}$ of the S, the bit value $c_i$ of the C, and the bit value $c_{i-1}$ of the C to obtain the final results of the S and C.

The carry $cA_{i-1}$ denotes the carry of a bit that is one bit lower in position than the bit of the carry $cA_i$, which is output from the first full adder unit 171. The bit value $s_{i+1}$ of the S denotes the sum of a bit that is one bit higher in position than the interim bit value $s_i$, which output from the second full adder unit 175. The bit value $c_{i-1}$ of the C denotes the carry of a bit that is one bit lower in position than the bit value $c_i$, which is output from the second full adder unit 175.

As shown in FIG. 2, the LSBs of the carry $cA_{i-1}$ and the carry $c_{i-1}$ are in the first logic state, and the most significant bit (MSB) of the sum $s_{i+1}$ is equal to the bit value $cA_{n-1}$ at a clock pulse before the carry propagation adder signal ONCPA is activated. The bit value $cA_{n-1}$ is the MSB of the carry $cA_i$ that is output from the first full adder unit 171.

Figure 3:
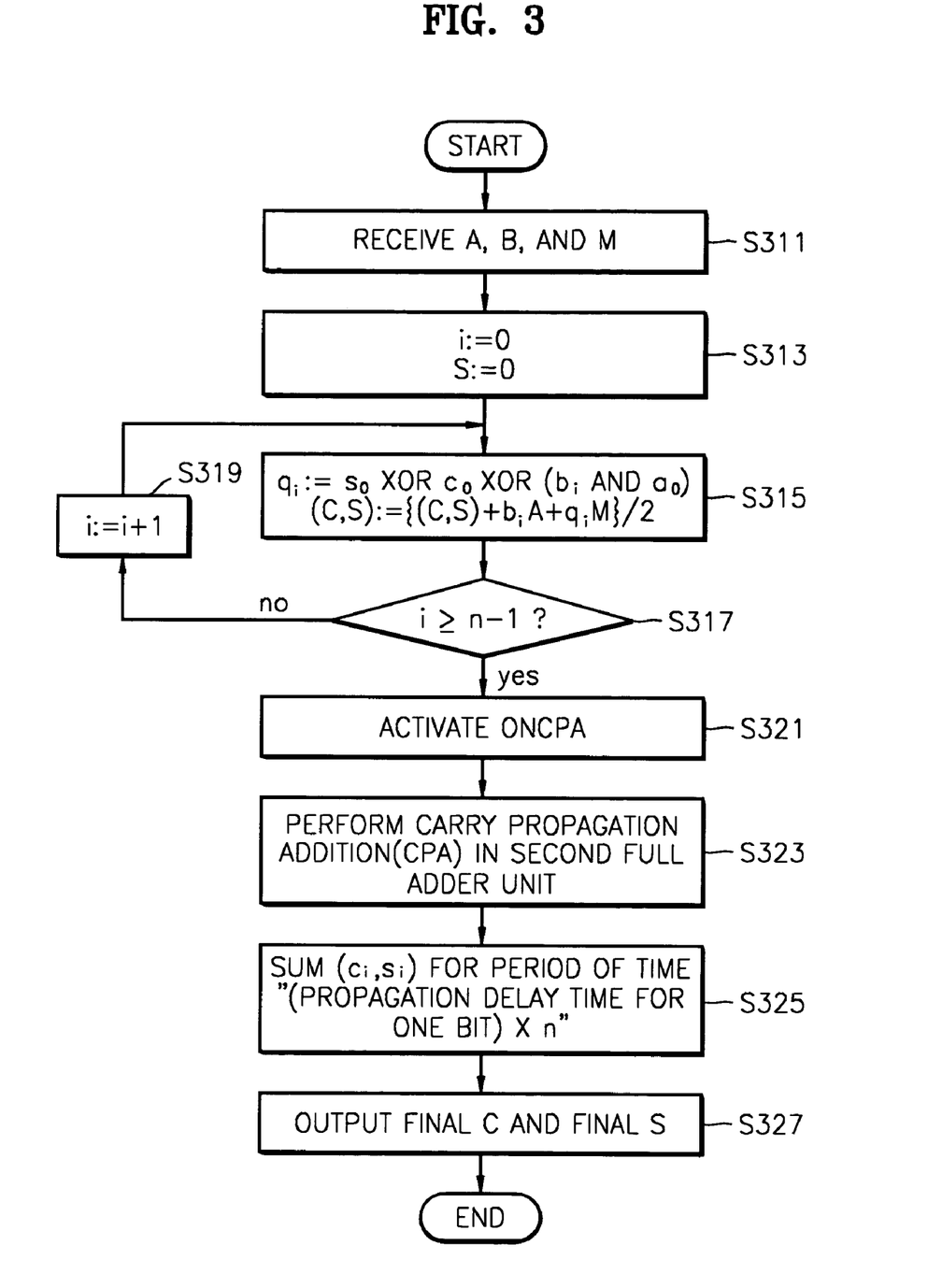
FIG. 3 is a flowchart for illustrating the operation of the Montgomery modular multiplier according to an embodiment of the present invention in an exemplary embodiment of the present invention.

The operation of the Montgomery modular multiplier according to an embodiment of the present invention of FIGS. 1 and 2 will now be described in detail with reference to FIG. 3.

The Montgomery modular multiplier according to an embodiment of the present invention includes registers, which store bit values $a_i$, $b_i$, $m_i$, $c_i$, and $s_i$ (where i denotes an integer in the range of 0 to n*1) of a word A, a word B, a modulus M, a carry C, and a sum S, respectively, and calculates a value congruent to "$ABR^{-1}$" (mod M). Here, A and B are input n-bit numbers, and $R^{-1}$ is an inverse number of R modular-multiplied for "mod A".

In the operation of the Montgomery modular multiplier, first, the numbers A and B and the modulus M are received in step S311. In step S313, registers which store a parameter i and the sum S are reset to be 0 and initialized. The numbers A and B are smaller than the modulus M, and M is an odd number.

Thereafter, in step S315 to S319, the $q_i$ calculation logic circuit 150 of the Montgomery modular multiplier obtains a value $q_i$ (where i denotes an integer in the range of 0 to n*1) used in the "or" loop of Algorithm 1, by solving the Boolean logic equation "$s_0$ XOR $c_0$ XOR ($b_i$ AND $a_0$)". Here, $s_0$ is the LSB of a sum S, $c_0$ is the LSB of a carry C, $b_i$ is a bit value of the number B, and $a_0$ is the LSB of the number A. Also, in steps S315 to S319, the $b_iA$ calculation logic circuit 140 multiplies the number A by the bit value $b_i$ to obtain each bit of $b_iA$, and the $q_iM$ calculation logic circuit 160 calculates each bit of $q_iM$ by multiplying the modulus M by the bit value $q_i$. Also, in steps S315 to S319, the 4-2 compressor 170 performs n additions on the C, the S, the $b_iA$, and the $q_iM$ to obtain interim values for each bit of the S and the C, in a carry save adder structure, which is formed when the carry propagation adder signal ONCPA is in an inactive state, that is, is in a first logic state ("0").

Figure 4:
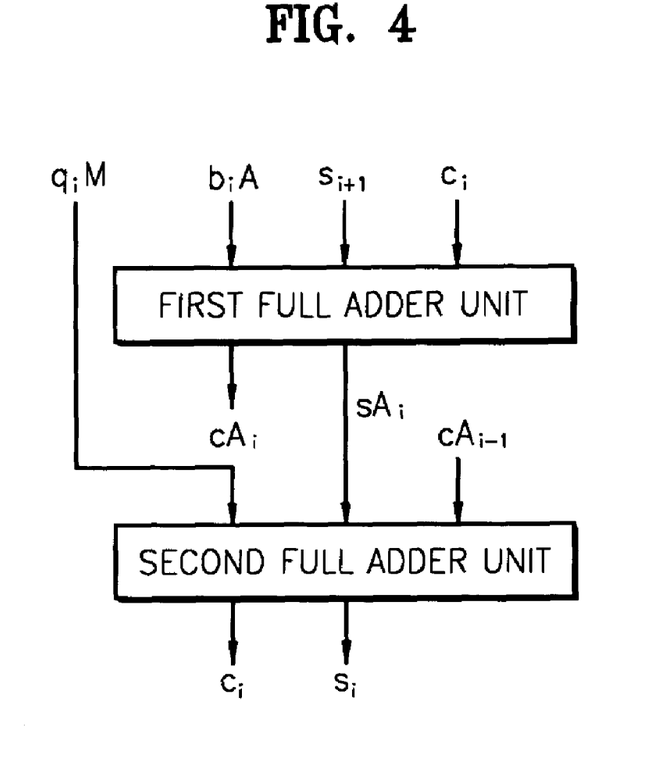
FIG. 4 is a block diagram for explaining the operation of a carry save adder in the Montgomery modular multiplier according to an embodiment of the present invention in an exemplary embodiment of the present invention.

FIG. 4 is a block diagram for explaining the operation of a carry save adder in the Montgomery modular multiplier according to an embodiment of the present invention. Referring to FIGS. 3 and 4, in steps S315 to S317, each first full adder of the first full adder unit 171 sums its corresponding bit value of the $b_iA$, the bit value $s_{i+1}$ of the S, and the bit value $c_i$ of the C to obtain a carry $cA_i$ and a sum $sA_i$. Each second full adder of the second full adder unit 175 performs n additions on its corresponding bit value of the $q_iM$, the sum $sA_i$, and the carry $cA_{i-1}$, which are selected by the MUX unit 173, thereby calculating the interim values $s_i$ and $c_i$ of the sum S and the carry C.

As shown in FIG. 2, the bit output of the carry C is input to a first full adder corresponding to the bit, the bit output of the sum S is input to a first full adder corresponding to a bit that is one bit lower in position than the output bit, and a 1/2 division operation included in the "for" loop of Algorithm 1 is performed, in step S315. The LSB of the carry $cA_{i-1}$ is in the first logic state "0". In other words, when the carry propagation adder signal ONCPA is in an inactive state, the 4-2 compressor 170 produces the carry save adder structure, which is a 4-input 2-output structure, and calculates the interim values of the S and C using the $b_iA$, and the $q_iM$.

After the interim values of the S and C are calculated for each bit, the carry propagation adder signal ONCPA is activated and enters in the second logic state "1", in step S321. In steps S323 to S327, the 4-2 compressor 170 sums the calculated interim values of the S and C to obtain the final values of the S and C, in the carry propagation adder structure.

Figure 5:
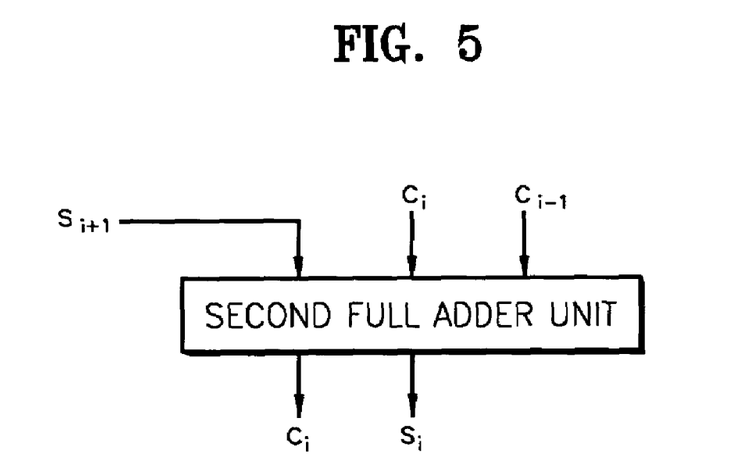
FIG. 5 is a block diagram for explaining the operation of a carry propagation adder in the Montgomery modular multiplier according to an exemplary embodiment of the present invention.

FIG. 5 is a block diagram for explaining the operation of the carry propagation adder in the Montgomery modular multiplier according to an embodiment of the present invention. Referring to FIGS. 3 and 5, in step S323, the second full adder unit 175 sums the bit value $s_{i+1}$ of the S, the bit value $c_i$ of the C, and the bit value $c_{i-1}$ of the C, which are selected by the MUX unit 173, to calculate the final results of the S and C. As shown in FIG. 2, the MSB of the sum $s_{i+1}$ is equal to the bit value $cA_{n-1}$ at a clock before the carry propagation adder signal ONCPA is activated. The LSB of the carry $c_{i-1}$ is in the first logic state "0".

In step S325, the bit value $s_{i+1}$ of the S, the bit value $c_i$ of the C, and the bit value $c_{i-1}$ of the C are summed for a period of time, (a propagation delay time for one bit)*(n bits), in the carry propagation adder structure. The propagation delay time for one bit consists of the propagation delay time of the second full adder unit 175 and the delay time of each of the 2:1 Muxes of the MUX unit 173. In other words, when the carry propagation adder signal ONCPA is in an active state, a 3-input 2-output carry propagation adder structure is established, and the interim values of the S and C are summed in the 3-input 2-output structure to calculate the final values of the S and C.

As described above, the Montgomery modular multiplier according to an embodiment of the present invention includes registers, which store bit values $a_i$, $b_i$, $m_i$, $c_i$, and $s_i$ (where i denotes an integer in the range of 0 to n*1) of a word A, a word B, a modulus M, a carry C, and a sum S, respectively, and calculates a value congruent to "$ABR^{-1}$" (mod M). Here, A and B are input n-bit numbers, and $R^{-1}$ is an inverse number of R modular-multiplied for "mod A". The $b_iA$ calculation logic circuit 140 calculates each bit of $b_iA$ by multiplying the number A by the bit value $b_i$. At this time, the $q_i$ calculation logic circuit 150 calculates a value $q_i$ (where i denotes an integer in the range of 0 to n*1) by solving a Boolean logic equation "$s_i$ XOR $c_0$ XOR ($b_0$ AND $a_0$)". Here, $s_0$ is the LSB of a sum S, $c_0$ is the LSB of a carry C, $b_i$ is a bit value of the number B, and $a_0$ is the LSB of the number A. The $q_iM$ calculation logic circuit 160 calculates each bit of $q_iM$ by multiplying the modulus M by the bit value $q_i$. In response to the carry propagation adder signal ONCPA, the 4-2 compressor 170 performs n additions on the C, the S, the $b_iA$, and the $q_iM$ to obtain interim calculated values for each bit of the S and the C, in a carry save adder structure. Then, the 4-2 compressor 170 sums the interim calculated values to obtain the final results of the S and C in a carry propagation adder structure. The final results of the S and C are output to the S- and C-registers 180 and 190, respectively.

As described above, the Montgomery modular multiplier according to an embodiment of the present invention removes propagation delay time by using a carry save adder (CSA) structure, in which all additions required for each bit are first performed on four words (e.g., C, S, $b_iA$, and $q_iM$), and then performs additions in a carry propagation adder (CPA) structure only at a final output stage. Hence, fast operation speed and a small power-delay product are achieved, thus improving the performance of a Montgomery modular multiplication algorithm.

Although embodiments of the present invention have been described with reference to various figures, the details of the figures should not be interpreted to limit the scope of the embodiments of the present invention. For example, FIG. 1 illustrates the use of a 4-2 compressor. The scope of the present invention is not limited to a 4-2 compressor, various embodiments can use a plurality of input and output compressors. Likewise the scope of the embodiments of the present invention are not limited to three registers, A, M, and B. Other registers may be incorporated in combination with a compressor having a plurality of inputs and outputs. Further, the radix of the examples of the various embodiments are not limited to a particular radix value.

While exemplary embodiments of the present invention have been particularly shown and described, it will be understood by those of ordinary skill in the art that various changes in form and details may be made therein without departing from the spirit and scope of the present invention as defined by the following claims.

What is claimed is:

1. A Montgomery modular multiplier of a public-key cryptographic system that calculates a value congruent to "$ABR^{-1}$" (mod M) used in the cryptographic system, where A and B are input n-bit numbers, $R^{-1}$ is an inverse number of R modular-multiplied for "mod M", and M is a modulus, the Montgomery modular multiplier comprising:

an A-register storing a bit value $a_i$ (where 'i' denotes an integer in the range of 0 to n−1) of the number A, which is smaller than the modulus M;

a B-register storing a bit value $b_i$ of the number B, which is smaller than the modulus M;

an M-register storing a bit value $m_i$ of the modulus M, which is an odd number;

a $b_iA$ calculation logic circuit multiplying the number A by the bit value $b_i$ to obtain $b_iA$;

a $q_i$ calculation logic circuit solving a Boolean logic equation "$s_0$ XOR $c_0$ XOR ($b_i$ AND $a_0$)", where $s_0$ is the least significant bit (LSB) of a sum S, $c_0$ is the LSB of a carry C, $b_i$ is the bit value of the number B, and $a_0$ is the LSB of the number A, to obtain a bit value $q_i$;

a $q_iM$ calculation logic circuit multiplying the modulus M by the bit value $q_i$ to obtain $q_iM$;

a 4-2 compressor performing 'n' additions on the carry C, the sum S, the $b_iA$, and the $q_iM$ to obtain interim values and summing the interim values to obtain a result using a carry propagation adder in response to a carry propagation adder signal;

an S-register in which a bit value $s_i$ of the sum S is updated and stored; and a C-register in which a bit value $c_i$ of the carry C is updated and stored.

2. The Montgomery modular multiplier of claim 1, wherein the 4-2 compressor comprises:

a first full adder unit summing a bit value $b_ia_i$ of the $b_iA$, a bit value $s_{i+1}$ of the sum S, and the bit value $c_i$ of the carry C to obtain a carry $cA_i$ and a sum $sA_i$;

a multiplexer (MUX) unit selectively outputting either a bit value $q_im_i$ of the $q_iM$, a carry $cA_{i-1}$, and the sum $sA_i$ or the bit value $s_{i+1}$ of the sum S, the bit value $c_i$ of the carry C, and a bit value $c_{i-1}$ of the carry C, in response to the carry propagation adder signal; and a second full adder unit performing 'n' additions on the bit value $q_im_i$ of $q_iM$, the carry $cA_{i-1}$, and the sum $sA_i$ to calculate interim bit values $s_i$ of the sum S and $c_i$ of the carry C, when the carry propagation adder signal is in an inactive state, and summing the bit value $s_{i+1}$ of the sum S, the bit value $c_i$ of the carry C, and the bit value $c_{i-1}$ of the carry C to obtain final results of the sum S and the carry C, when the carry propagation adder signal is in an active state.

3. The Montgomery modular multiplier of claim 2, wherein a carry save adder structure is a 4-input 2-output structure, in which the first and second full adder units operate when the carry propagation adder signal is in the inactive state.

4. The Montgomery modular multiplier of claim 2, wherein a carry propagation adder structure is a 3-input 2-output structure, in which only the second full adder unit operates when the carry propagation adder signal is in the active state.

5. The Montgomery modular multiplier of claim 2, wherein the LSB of the carry $cA_{i-1}$ and the LSB of the carry $c_{i-1}$ are in a first logic state.

6. The Montgomery modular multiplier of claim 2, wherein the most significant bit (MSB) of the sum S is equal to the bit value $cA_{n-1}$ at a clock pulse before the carry propagation adder signal is activated.

7. A method of performing a Montgomery modular multiplication in a Montgomery modular multiplier of a public-key cryptographic system, in which the Montgomery modular multiplier includes registers for storing bit values $a_i$, $b_i$, $m_i$, $c_i$, and $s_i$ (where 'i' denotes an integer in the range of 0 to n−1) of a word A, a word B, a modulus M, a carry C, and a sum S, respectively, and calculates a value congruent to "$ABR^{-1}$" (mod M), where A and B are input n-bit numbers, $R^{-1}$ is an inverse number of R modular-multiplied for "mod M", and M is a modulus, the method comprising:

receiving the number A, the number B, and the modulus M;

multiplying the number A by a bit value $b_i$ to obtain each bit of $b_iA$;

solving a Boolean logic equation "$s_0$ XOR $c_0$ XOR ($b_i$ AND $a_0$)", where $s_0$ is the least significant bit (LSB) of a sum S, $c_0$ is the LSB of a carry C, $b_i$ is the bit value of the number B, and $a_0$ is the LSB of the number A, to obtain a bit value $q_i$;

multiplying the modulus M by the bit value $q_i$ to obtain each bit of $q_iM$;

performing 'n' additions on the carry C, the sum S, the $b_iA$, and the $q_iM$ to obtain interim values for each bit of the sum S and the carry C in a carry save adder structure, in response to a carry propagation adder signal; and summing the interim values to obtain the final results of the sum S and the carry C in a carry propagation adder structure, in response to the carry propagation adder signal.

8. The method of claim 7, wherein the number A is smaller than the modulus M.

9. The method of claim 7, wherein the number B is smaller than the modulus M.

10. The method of claim 7, wherein the modulus M is an odd number.

11. The method of claim 7, wherein the interim values and final results of the sum S and the interim values and final results of the carry C are calculated by:

summing a bit value $b_ia_i$ of the $b_iA$, a bit value $s_{i+1}$ of the sum S, and a bit value $c_i$ of the carry C to obtain a carry $cA_i$ and a sum $sA_i$;

selectively outputting either a bit value $q_im_i$ of the $q_iM$, a carry $cA_{i-1}$, and the sum $sA_i$ or the bit value $s_{i+1}$ of the sum S, the bit value $c_i$ of the carry C, and a bit value $c_{i-1}$ of the carry C, in response to the carry propagation adder signal;

performing 'n' additions on the bit value $q_im_i$ of the $q_iM$, the carry $cA_{i-1}$, and the sum $sA_i$ to calculate interim bit values $s_i$ of the sum S and $c_i$ of the carry C, when the carry propagation adder signal is in an inactive state; and summing the bit value $s_{i+1}$ of the sum S, the bit value $c_i$ of the carry C, and the bit value $c_{i-1}$ of the carry C to obtain final results of the sum S and the carry C, when the carry propagation adder signal is in an active state.

12. The method of claim 7, wherein the carry save adder structure is a 4-input 2-output structure, in which the interim values of the sum S and the carry C are obtained from the $b_iA$ and the $q_iM$ when the carry propagation adder signal is in an inactive state.

13. The method of claim 7, wherein the carry propagation adder structure is a 3-input 2-output structure, in which the final results of the sum S and the carry C are obtained from the interim values of the sum S and the carry C when the carry propagation adder signal is in an active state.

14. The method of claim 11, wherein the LSB of the carry $cA_{i-1}$ and the LSB of the carry $c_{i-1}$ are in a first logic state.

15. The method of claim 11, wherein the most significant bit (MSB) of the sum S is equal to the bit value $cA_{n-1}$ at a clock pulse before the carry propagation adder signal is activated.

16. A Montgomery modular multiplier of a public-key cryptographic system, comprising:
- a multiplicand register, storing a bit value $a_i$ of a number A;
- a modulus register, storing a bit value $m_i$ of a modulus M;
- a multiplier register, storing a bit value $b_i$ of a number B;
- a $b_iA$ calculation logic circuit multiplying the number A by a bit value $b_i$ to obtain each bit of $b_iA$;
- a $q_i$ calculation logic circuit solving a Boolean logic equation "$s_0$ XOR $c_0$ XOR ($b_i$ AND $a_0$)", where $s_0$ is the least significant bit (LSB) of a sum S, $c_0$ is the LSB of a carry C, $b_i$ is the bit value of the number B, and $a_0$ is the LSB of the number A, to obtain a bit value $q_i$ (where 'i' denotes an integer in the range of 0 to n−1);
- a $q_iM$ calculation logic circuit multiplying the modulus M by the bit value $q_i$ to obtain each bit of $q_iM$; and
- a t-s compressor, wherein t>3 and s>1, performing 'n' additions on the carry C, the sum S, the $b_iA$, and the $q_iM$ to obtain interim values for each bit of the sum S and the carry C in a carry save adder structure and summing the interim values to obtain final results of the sum S and the carry C in a carry propagation adder structure, in response to a carry propagation adder signal.

17. A system embodying a Montgomery modular multiplier of a public-key cryptographic system, the system comprising:
- an A-register storing a bit value $a_i$ (where 'i' denotes an integer in the range of 0 to n−1) of an n-bit number A;
- a B-register storing a bit value $b_i$ of an n-bit number B;
- an M-register storing a bit value $m_i$ of an n-bit modulus M;
- a $b_iA$ calculation logic circuit multiplying the number A by the bit value $b_i$ to obtain $b_iA$;
- a $q_i$ calculation logic circuit solving a Boolean logic equation "$s_0$ XOR $c_0$ XOR ($b_i$ AND $a_0$)", where $s_0$ is the least significant bit (LSB) of a sum S, $c_0$ is the LSB of a carry C, $b_i$ is the bit value of the number B, and $a_0$ is the LSB of the number A, to obtain a bit value $q_i$;
- a $q_iM$ calculation logic circuit multiplying the modulus M by the bit value $q_i$ to obtain $q_iM$;
- a compressor performing 'n' additions on the carry C, the sum S, the $b_iA$, and the $q_iM$ to obtain interim values and summing the interim values to obtain a result using a carry propagation adder in response to a carry propagation adder signal;
- an S-register in which a bit value $s_i$ of the sum S is updated and stored; and
- a C-register in which a bit value $c_i$ of the carry C is updated and stored;
- wherein given that the number A is smaller than the modulus M, the number B is smaller than the modulus M, the modulus M is odd, and $R^{-1}$ is an inverse number of R modular-multiplied for "mod M", the system calculates a value congruent to "$ABR_{-1}$" (mod M).

18. The system of claim 17, wherein the value congruent to "$ABR^{-1}$" (mod M) is used in the public-key cryptographic system.

19. The system of claim 17, wherein the value congruent to "$ABR^{-1}$" (mod M) is used in the system as a cryptographic key.

* * * * *